(12) United States Patent
Hirata et al.

(10) Patent No.: US 10,656,892 B2
(45) Date of Patent: May 19, 2020

(54) PRINTER REGISTRATION APPARATUS, DISPLAY APPARATUS, AND METHOD FOR PRINTER REGISTRATION

(71) Applicant: CANON KABUSHIKI KAISHA, Tokyo (JP)

(72) Inventors: Kensuke Hirata, Kawasaki (JP); Kei Kitagata, Yokohama (JP); Kenichi Shirai, Ichikawa (JP); Takahiko Nishida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 15/301,295

(22) PCT Filed: Apr. 2, 2015

(86) PCT No.: PCT/JP2015/001884
§ 371 (c)(1),
(2) Date: Sep. 30, 2016

(87) PCT Pub. No.: WO2015/151526
PCT Pub. Date: Oct. 8, 2015

(65) Prior Publication Data
US 2017/0017448 A1    Jan. 19, 2017

(30) Foreign Application Priority Data

Apr. 4, 2014 (JP) .................. 2014-077752

(51) Int. Cl.
*G06F 3/12* (2006.01)
*H04L 29/08* (2006.01)
(Continued)

(52) U.S. Cl.
CPC .......... *G06F 3/1288* (2013.01); *G06F 3/1204* (2013.01); *G06F 3/1209* (2013.01);
(Continued)

(58) Field of Classification Search
CPC ..................................................... G06F 3/1288
See application file for complete search history.

(56) References Cited

U.S. PATENT DOCUMENTS

2003/0103235 A1\* 6/2003 Gomi .................... G06F 3/1229
358/1.15
2003/0217194 A1\* 11/2003 Kazumi ................ G06F 9/4411
719/321
(Continued)

FOREIGN PATENT DOCUMENTS

| JP | 2003-196054 A | 7/2003 |
| JP | 2013-050804 A | 3/2013 |
| WO | 2014-017058 A1 | 1/2014 |

*Primary Examiner* — Andrew C Georgandellis
(74) *Attorney, Agent, or Firm* — Canon USA Inc. IP Division

(57) ABSTRACT

When virtual printers are collectively registered with a plurality of print services through one operation, a virtual printer may be registered also with print services not utilized. In the present invention, by acquiring information regarding print services, provided by a plurality of print services, and information regarding virtual printers registered with the print services, it is determined, on a basis of the information regarding the virtual printers and a printer ID of the local printer, whether or not the local printer has been registered as a virtual printer with the print services. Information regarding the print service with which the local printer is determined not to have been registered is displayed, and when instructed by a user to register the local printer with the displayed print service as a virtual printer, the local printer is registered as the virtual printer with the instructed print service.

11 Claims, 8 Drawing Sheets

(51) Int. Cl.
*H04L 12/46* (2006.01)
*H04L 12/24* (2006.01)
*H04L 29/06* (2006.01)

(52) U.S. Cl.
CPC .......... *G06F 3/1229* (2013.01); *G06F 3/1287* (2013.01); *G06F 3/1292* (2013.01); *H04L 12/4641* (2013.01); *H04L 41/0803* (2013.01); *H04L 67/02* (2013.01); *H04L 67/10* (2013.01); *H04L 67/42* (2013.01); *G06F 3/1226* (2013.01)

(56) References Cited

U.S. PATENT DOCUMENTS

| | | | |
|---|---|---|---|
| 2004/0137855 A1* | 7/2004 | Wiley | G06F 3/1204 455/88 |
| 2012/0218599 A1* | 8/2012 | Kashioka | G06F 3/1222 358/1.15 |
| 2013/0163038 A1* | 6/2013 | Oishi | G06F 3/1204 358/1.15 |
| 2013/0235418 A1* | 9/2013 | Tanaka | H04N 1/00228 358/1.15 |

* cited by examiner

FIG. 4A

| USER ID | PRINTER ID | PRINTER NAME | PRINTER CAPABILITIES | IP ADDRESS | STATUS | UPDATE |
|---|---|---|---|---|---|---|
| user@xxx.com | 45787890-34e4-32a4-8921-446655440000 | PRINTER 1 | ... | 192.168.0.1 | ERROR | 1/1/2014 12:30:01 |
| user@xxx.com | 14290453-1ee2-33a5-5647-890771346112 | PRINTER 2 | ... | 192.168.0.5 | - | 12/1/2013 11:20:10 |
| user@xxx.com | 87629123-16c8-32a8-1245-532394780235 | PRINTER 3 | ... | 172.20.0.4 | - | 2/1/2014 3:40:02 |
| user@xxx.com | 33677112-6c5b-8d71-3452-128923434545 | PRINTER 4 | ... | 192.168.0.5 | IDLE | 3/1/2014 5:30:12 |
| user@xxx.com | 76541823-5d6c-7789-1147-564252345234 | PRINTER 5 | ... | 192.168.5.1 | - | 3/1/2014 7:40:03 |

| CONTENTS |
|---|
| PDF |
| DOCX |
| DOC |
| JPEG |
| ... |

| CAPABILITIES |
|---|
| N-UP |
| DUPLEX |
| COLOR |
| ... |

| NAME |
|---|
| X |
| ... |

FIG. 4B

| SERVICE | SERVICE URL | CHARGE |
|---|---|---|
| COMPANY X | Http://X.com | CHARGED |
| COMPANY Y | Http://Y.com | FREE |
| COMPANY Z | Http://Z.co.jp | CHARGED |
| ... | ... | ... |

| PRIORITY |
|---|
| CHARGED / FREE |
| LOCAL PRINTER PREFERRED |
| PRIORITY SERVICE |

FIG. 4C

| PRINTER ID | IP ADDRESS | STATUS | VENDOR |
|---|---|---|---|
| 45787890-34e4-32a4-5647-446655440000 | 192.168.0.1 | NOTIFIED | x |

| CAPABILITIES |
|---|
| N-UP |
| DUPLEX |
| COLOR |
| ... |
| ... |

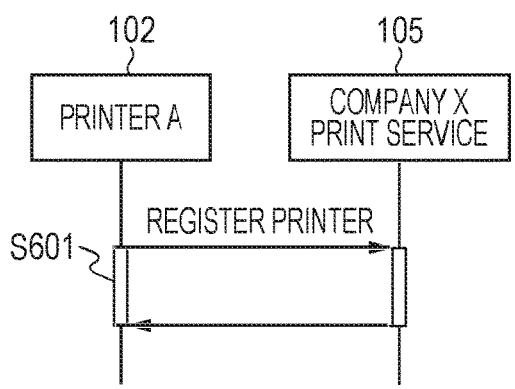
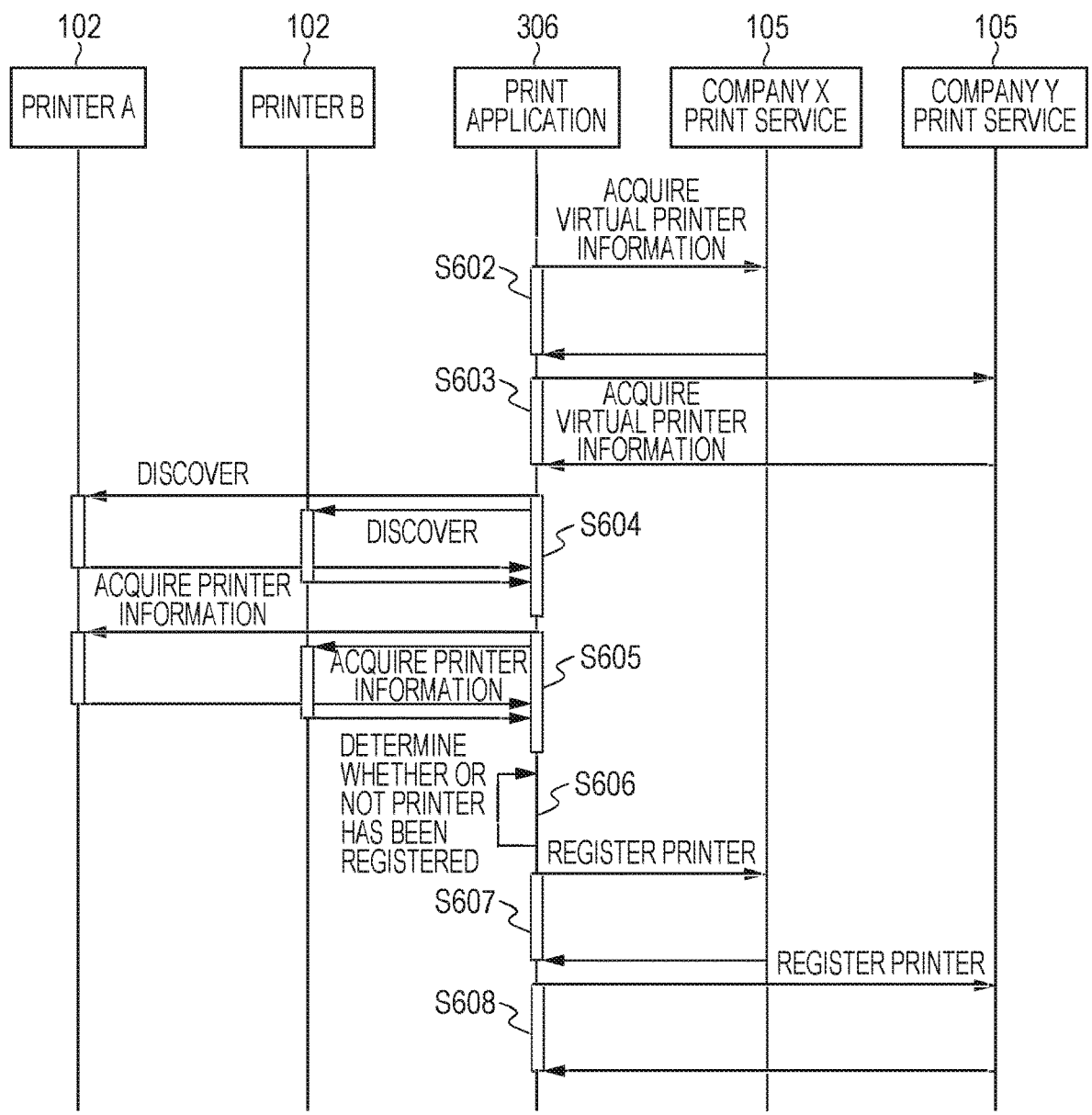

PRINTER REGISTRATION APPARATUS, DISPLAY APPARATUS, AND METHOD FOR PRINTER REGISTRATION

CROSS REFERENCE TO RELATED APPLICATIONS

This application is a National Stage filing of International Application No. PCT/JP2015/001884 filed Apr. 2, 2015, which claims the benefit of priority from Japanese Patent Application No. 2014-077752 filed Apr. 4, 2014, the disclosures of each of which are hereby incorporated by reference herein in their entirety.

TECHNICAL FIELD

The present invention relates to printer registration apparatuses for registering virtual printers with a plurality of print services.

BACKGROUND ART

A technique is known in which, when a client transmits a print instruction to a server, the server which has received the print instruction converts content to be printed into print data and performs print processing by using the converted print data.

In PTL 1, a client apparatus, which has received from a user a request for printing application data created by an application within a server, transmits a generation request for generating print data from the application data to an application of the server. The server, upon receipt of the generation request and information regarding a client which has issued the generation request, generates print data in accordance with print control information according to the information regarding the client. In other words, the server described in PTL 1 provides a client with a service for generating print data.

Such a form of service in which a server provides a print service to a client is known. On the other hand, cloud computing, which has drawn attention in recent years, is also a form of service in which a server provides a service to a client. Cloud computing is mainly characterized in that requests from a plurality of clients are simultaneously processed in such a manner that data conversion or data processing is performed by using a lot of computing resources, through distributed computing. At present, there are a plurality of vendors which provide various services by implementing web services in this cloud computing environment.

On the other hand, a method is known in which printing is performed by directly transmitting print data from a mobile terminal, such as a smart phone, to a printer. In this method, document data needs to be converted into print data within the mobile terminal, thereby causing a shortage of memory in some cases, depending on the mobile terminal. The web server disclosed in PTL 2, upon receipt of a print request from an image forming apparatus, instructs a print service to generate print data. The image forming apparatus receives the print data from the print service and performs printing, and notifies the print service of a print status whenever the print status changes. A system for performing printing through the combination of such a mobile terminal, a printer, and a server is called cloud printing.

In order to make a plurality of print services that exist on a network available for use, registration of a virtual printer needs to be made for the printer services. A method for avoiding these laborious registration operations may involve collectively instructing the print services to register virtual printers. However, when virtual printers are collectively registered with all the print services, virtual printers, which are not actually used, may be registered.

CITATION LIST

Patent Literature

PTL 1: Japanese Patent Laid-Open No. 2003-196054
PTL 2: Japanese Patent Laid-Open No. 2013-050804

SUMMARY OF INVENTION

To solve the problems described above, a printer registration apparatus of the present invention includes: an acquisition unit that acquires information regarding print services, provided by a plurality of print services, and information regarding virtual printers registered with the print services; a searching unit that searches for a local printer connected to a local network; a determination unit that determines, on a basis of the information regarding the virtual printers acquired by the acquisition unit and a printer ID of the local printer searched for by the searching unit, whether or not the local printer has been registered as a virtual printer with the plurality of print services; a display unit that displays the information regarding print services acquired by the acquisition unit, for the print service with which the local printer is determined not to have been registered; and a registration unit that, when instructed by a user to register the local printer as a virtual printer with the print service displayed by the display unit, registers the local printer as the virtual printer with the instructed print service.

Further features of the present invention will become apparent from the following description of exemplary embodiments with reference to the attached drawings.

BRIEF DESCRIPTION OF DRAWINGS

FIG. 4A illustrates table structures managed by an apparatus.
FIG. 4B illustrates table structures managed by an apparatus.
FIG. 4C illustrates table structures managed by an apparatus.
FIG. 6A illustrates a printer discovery sequence.
FIG. 6B illustrates a printer discovery sequence.

DESCRIPTION OF EMBODIMENTS

First Embodiment

System Configuration

Figure 1:
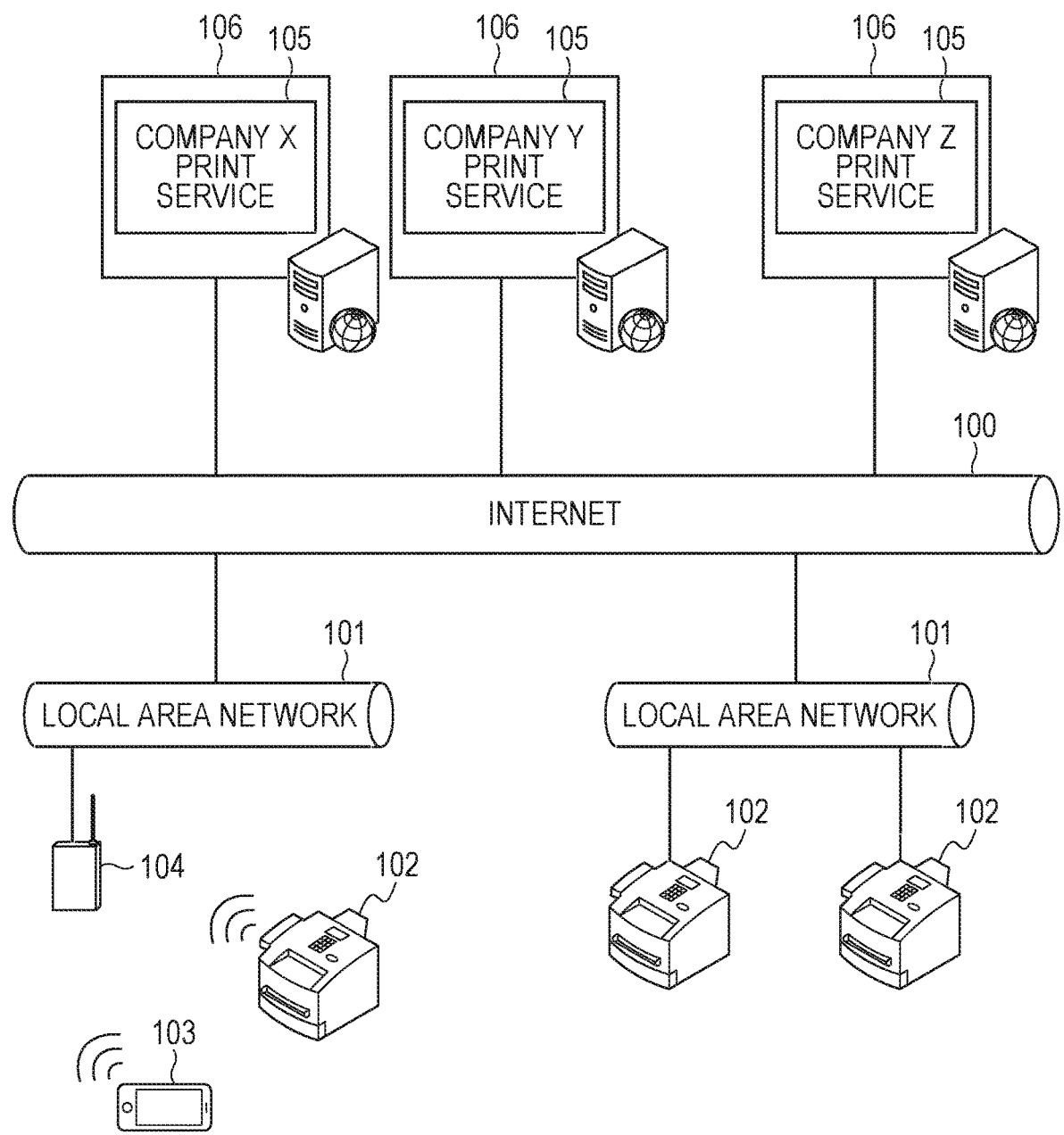
FIG. 1 is a system configuration diagram.

FIG. 1 is a diagram illustrating the whole configuration of a mobile printing system according to the present embodiment. It is assumed that a plurality of printers 102 are connected to a plurality of mobile terminals 103 through wired or wireless local area networks (LAN) 101. The printers (local printers) 102 and the mobile terminals 103 can access a plurality of print services 105 provided by a plurality of companies, by accessing the Internet 100 through the local area networks 101. In the present embodiment, it is assumed that the mobile terminals 103 are connected to the network through a wireless LAN terminal 104. However, the mobile terminals 103 may be connected to the network through a wireless network provided by a mobile data communication carrier. Further, it is only required that the mobile terminals 103 be connected to the print services 105 through the Internet, and the printers 102 be connected to the print services 105 through the Internet 100. The printers 102 and the mobile terminals 103 need not be in a state in which the printers 102 can directly communicate with the mobile terminals 103. The wireless LAN terminal 104 is the master of a wireless LAN and has a function of a general network router, thereby providing a wireless LAN at home or in an office. Each of the print services 105 is a cloud service which converts content data transmitted from a mobile terminal 103 into data (for example PDL data) that can be read by a printer 102 and transmits the PDL data to the printer 102 so that the PDL data is printed by the printer 102. The print services 105 have a function of storing information about registered printers 102 as virtual printer information 400, and can register a printer on the basis of an instruction from the mobile terminal 103 or can instruct a virtual printer to perform printing.

Note that it is assumed that there are a plurality of print services 105, and various services are provided by the vendors that provide print services, in the present embodiment. It is assumed that the print services 105 are running on respective print servers 106, but the configuration is not limited to this, and there may be a case in which a plurality of print services are running on a single print server.

Hardware Configuration of Mobile Terminal

Figure 2A:
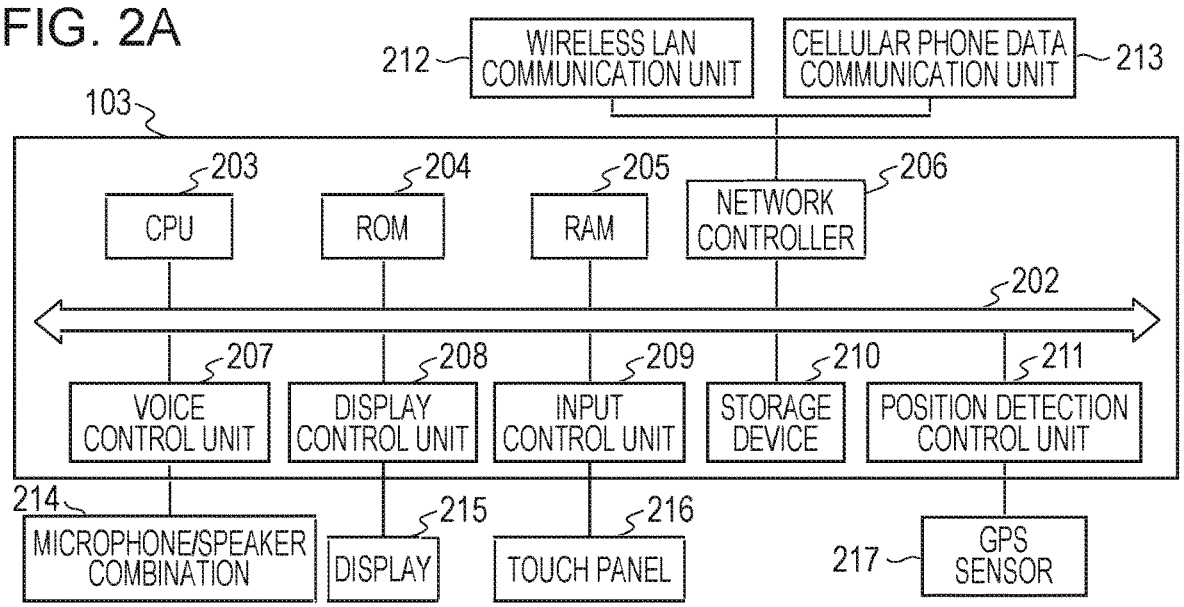
FIG. 2A is a hardware configuration diagram of an apparatus.

FIG. 2A is an example hardware configuration diagram of the mobile terminal 103. Configuration components are connected to a system bus 202.

The operating system and application programs controlling voice communication and data communication are stored in a ROM 204. A CPU 203 functions as a processing unit that performs various kinds of processing described later by executing these programs. Note that application programs that control data communication include mail software, a web browser, and the like. A RAM 205 is used as a work memory area at the time when the CPU 203 executes programs. The RAM 205 is also used as a memory for temporarily storing web page data acquired from web servers by a web browser and authentication information for accessing web services. A storage device 210, which is a non-volatile storage unit, stores various kinds of mode settings, an operation log, and the like that need to be maintained until after the mobile terminal is reactivated.

A network controller 206 performs network control for a wireless LAN communication unit 212 and a cellular phone data communication unit 213 used to join a wireless communication network that is provided by a cellular phone carrier. In general, when a wireless LAN allows new connections, the network controller 206 gives connection priority to the wireless LAN. When the mobile terminal moves beyond the coverage of the wireless LAN, a wireless communication network provided by the cellular phone carrier is joined. A voice control unit 207, which is used mainly when a user makes a phone call by using a voice communication application, interfaces between the voice communication application and the input/output of voice data using a microphone/speaker combination 214. A display control unit 208 controls information to be displayed on a display 215 of the mobile terminal. An input control unit 209 performs control for information provided by a user through buttons or a touch panel 216 of the mobile terminal. An application in the mobile terminal provides a user with network communication information and various types of information about the mobile terminal by using the voice control unit 207, the display control unit 208, and the input control unit 209. Position information about the mobile terminal is acquired from a UPS sensor 217 by the position detection control unit 211 and is provided to the OS. These control functions are realized as a result of the CPU 203 executing computer programs such as the OS and applications.

Hardware Configuration for Print Service

Figure 2B:
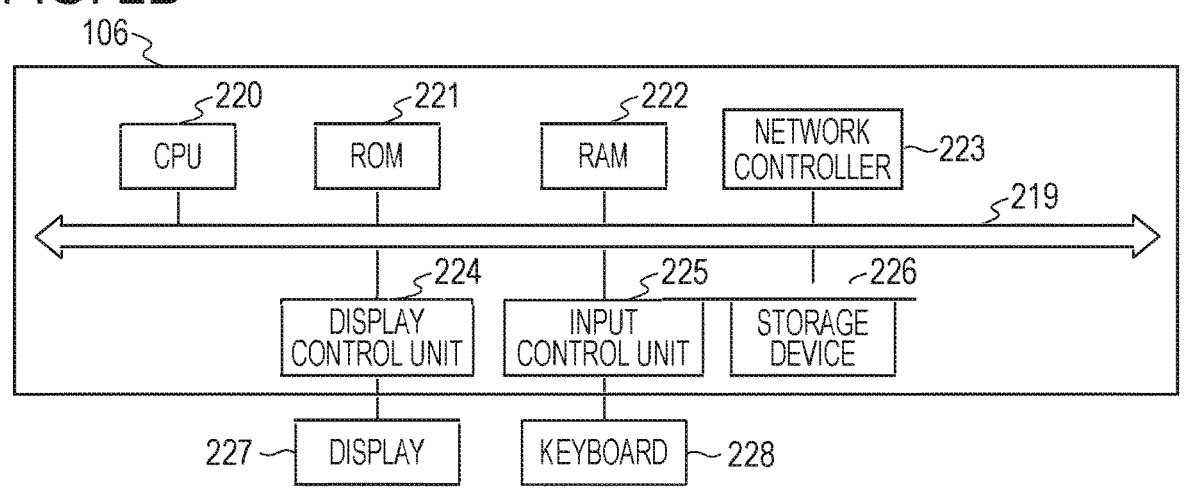
FIG. 2B is a hardware configuration diagram of an apparatus.

FIG. 2B is a diagram illustrating an example hardware configuration of the print server 106. Note that the print server that provides the print service of the present invention may be formed of a stand-alone apparatus or a system formed of a plurality of apparatuses. In the present embodiment, description is made under the assumption that configuration components are connected to one another through a system bus 219. A CPU 220 executes application programs, a print driver program, the operating system, and a mobile printing system program according to the present invention, stored in a storage device 226. Further, under the control of the CPU 220, information, files, and the like necessary in executing the computer programs are temporarily stored in a RAM 222. The CPU 220 opens various registered windows and executes various kinds of processing on the basis of commands input by a mouse or the like displayed on a display 227. A ROM 221, which is a storage unit, stores programs such as basic I/O programs and the like and various kinds of data such as font data used in document processing, data for templates, and the like. The RAM 222 is a temporary memory unit and functions as the main memory of the CPU 220, work areas, and the like. A display control unit 224 controls information to be displayed on the display 227 as an output. An input control unit 225 receives information that is input by a keyboard 228 and communicates with the CPU 220. A storage device 226 is an external storage unit functioning as a large-capacity memory and stores application programs, print driver programs, the OS, and the like. The keyboard 228 is an instruction input unit which is used by a user to input instructions and the like to the apparatus.

Hardware Configuration of Printer

Figure 2C:
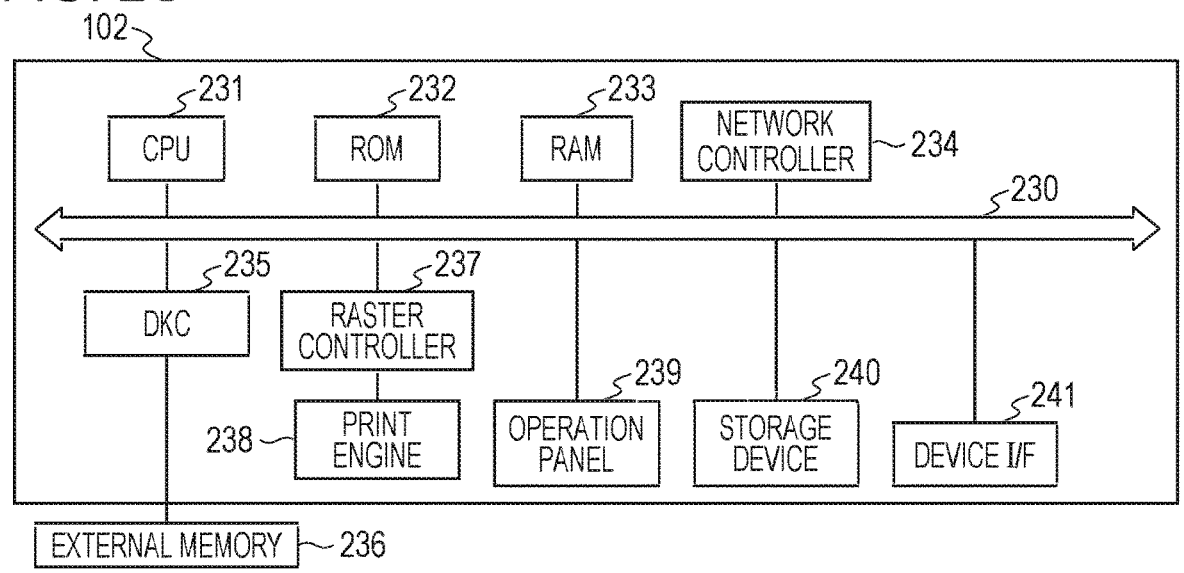
FIG. 2C is a hardware configuration diagram of an apparatus.

FIG. 2C is a hardware configuration diagram of the printer 102. The configuration components are connected to a system bus 230. A CPU 231 controls the whole apparatus and performs overall control of access to/from the various devices connected to the system bus 230. The CPU 231 controls the whole apparatus by executing control programs stored in a ROM 232 or an external memory 236. A RAM 233 is used as the main memory of the CPU 231, a work area, and the like. A storage device 240 is an external storage unit functioning as a large amount of memory, and stores computer programs and the like according to the present invention. An operation panel (operation unit) 239, which is formed of a touch panel, displays an operation screen or receives an instruction of a user through the operation screen. Further, setting of the operation mode of the printer 102 is performed on the operation panel 239, and the operation panel 239 also displays the operation status of the printer 102 and operation buttons or the like used for setting copying settings. A network controller 234, which is a network interface card (NIC), receives data from and sends data to an external apparatus. A print engine 238 is a print unit that performs printing using printing technologies such as electrophotography (laser beam method), an inkjet method, and a dye sublimation (heat transfer) method. A raster controller 237 is a controller that converts print data (PDL data) presented in the PDL/PDF format. A device OF 241 is an interface for connecting external devices that can be connected through, for example, a USB interface.

Software Configuration of Print Service

Figure 3A:
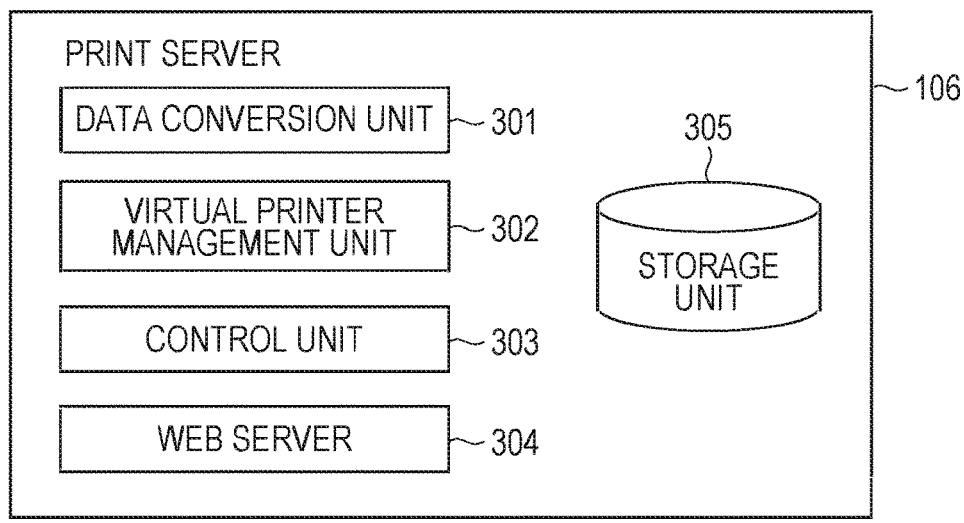
FIG. 3A is a software component configuration diagram of an apparatus.

FIG. 3A is a software configuration diagram of the print service 105. Note that software modules are stored in the storage device 226 illustrated in FIG. 2B. As described above, the CPU 220 functions as processing units 301-304 described later by loading computer programs in the RAM 222 and executing them.

A data conversion unit 301 converts a document file received from the mobile terminal 103 into print data (for example, PDL data) having a data format that can be printed by the printer 102. A virtual printer management unit 302 stores information about a virtual printer described later with reference to FIG. 4A in a storage unit 305, and reads virtual printer information from the storage unit 305 in response to an external request and makes a response. A control unit 303 performs information communication between a virtual printer management unit 302 and a web server 304 and requests the data conversion unit 301 to perform data conversion processing. The control unit 303 transmits the print data converted by the data conversion unit 301 in response to a print data acquisition request from the printer 102 or the mobile terminal 103. Alternatively, it can also be assumed that the control unit 303 transmits the print data directly to the printer 102. The web server 304 provides various interfaces described later, accepts printer registration, and checks the effectiveness of received information. Information kept by the print service 105 described later with reference to FIG. 4A is stored in the storage unit 305.

Software Configuration of Mobile Terminal

Figure 3B:
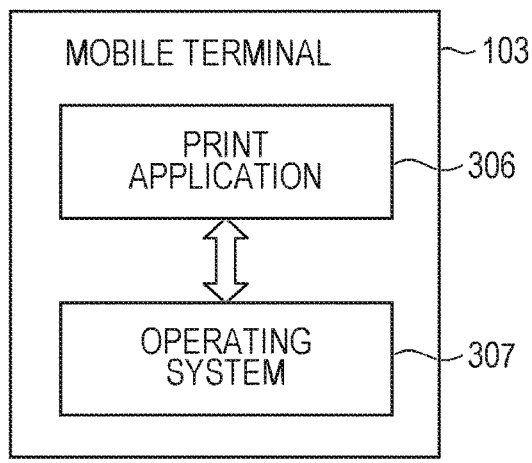
FIG. 3B is a software component configuration diagram of an apparatus.

FIG. 3B is a software configuration diagram of the mobile terminal 103. Note that software modules are stored in the storage device 210 illustrated in FIG. 2A, and as described above, the CPU 203 executes the computer programs by loading them in the RAM 205. In the present embodiment, it is assumed that a print application 306 is installed on an operating system (OS) 307 of the mobile terminal 103, and processing of the present invention is performed by the print application 306. When the print application 306 communicates with the printer 102 and the print service 105, the network controller 206 controlled by the OS 307 is utilized. The print application 306 communicates with the printer 102 and the print service 105 in response to an operation of a user, and performs processing for registering a printer, uploading a document file, instructing printing, and the like.

Software Configuration of Printer

Figure 3C:
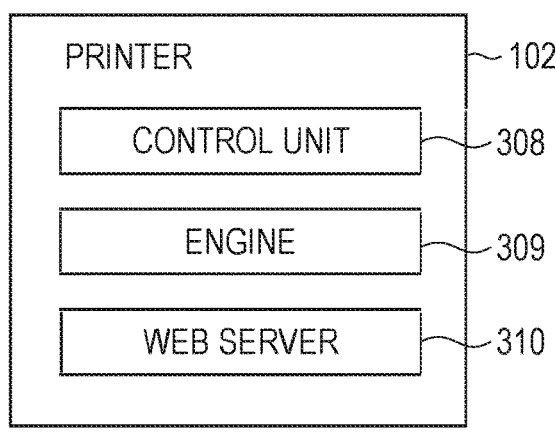
FIG. 3C is a software component configuration diagram of an apparatus.

FIG. 3C a software configuration diagram of the printer 102. Note that software modules are stored in the storage device 240 illustrated in FIG. 2C, and as described. above, the CPU 231 functions as processing units 308 and 310 described later by loading the computer programs in the RAM 233 and executing them.

A control unit 308, in response to a request received by a web server 310, responds with the printer information and print attributes illustrated in FIG. 4C. An engine 309 interprets print data transmitted from the mobile terminal 103 and the print service 105 and performs printing by using a converted print image. The web server 310 receives a printer information acquisition request from the mobile terminal 103 or the print service 105.

Data Tables of Print Service

FIG. 4A illustrates a plurality of data tables that are stored in storage device 226 by the print service 105. A configuration may be employed in which these data tables are not stored in the storage device 226 of the print server 106 and are stored in another server which is configured in such a manner as to be able to communicate with the print server 106 through the Internet 100 or the local area network 101. The plurality of data tables stored in the print service 105 include tables of the virtual printer information 400, supported content information 420, print attributes 421, and vendor information 422.

The virtual printer information stored in the table 400 is delivered via the web server 304 at the time of registering virtual printer information, and is stored in the storage unit 305 by the print service 105. A user ID 401, which is delivered at the time when a client accesses the web server 304, is a user identifier for identifying a user who requested the print service 105. In the present embodiment, the virtual printer information 400 is stored for each user ID. A printer ID 402 is a printer identifier for uniquely identifying the printer 102 in the whole system. The method of issuing the printer ID 402 is not specifically limited in the present embodiment. As long as uniqueness is assured, the printer ID 402 may be set to the printer 102 in advance, or may be issued by the printer 102 or a certain ID management server (not illustrated). A printer name 403 is a name that can be set by a user when a virtual printer is registered. Printer capabilities 404 are print attribute information pieces that can be specified by the printer 102. An IP address 405 is an IP address for identifying a device in a network. The print service 105 acquires information about a printer status from the printer 102 and stores it in a status 406.

The supported content information 420, the print attributes 421, and the vendor information 422 are basic pieces of information that are stored in advance by the print service 105. Content 407 contains information about document formats that can be processed by the print service 105. Capabilities 408 are print attributes that can be specified by the print service 105. A name 409 is the name of a vendor that provides the print service 105.

Data Tables of Mobile Terminal

FIG. 4B illustrates data tables that are stored in the storage device 210 by a print application 306 in a mobile terminal. The tables stored in the mobile terminal 103 include a table of print service information 423 and a table of priority information 424. A service 410 is the vendor name registered with the print application 306. A service URL 411 is a uniform resource locator (URL) for identifying a server that provides the service 410. A charge 412 is a charge for using each service 410 registered with the print application 306. A priority 413 is information used when the print application 306 determines which service is to be selected from among the services 410.

Data Tables of Printer

FIG. 4C illustrates data tables stored in the storage device 240 by the printer 102. The data tables stored by the printer 102 include a table of printer information 425 and a table of print attributes 426. A printer ID 414 is a unique printer identifier for identifying the printer 102. An IP address 416 is an IP address set to the printer 102. A status 417 is information indicating the status of the printer 102. A vendor 418 is information indicating a vendor that manufactured the printer 102. Capabilities 415 are pieces of information indicating print attributes that can be supported by the printer 102.

(Example Screens Displayed on Mobile Terminal)

Figure 5:
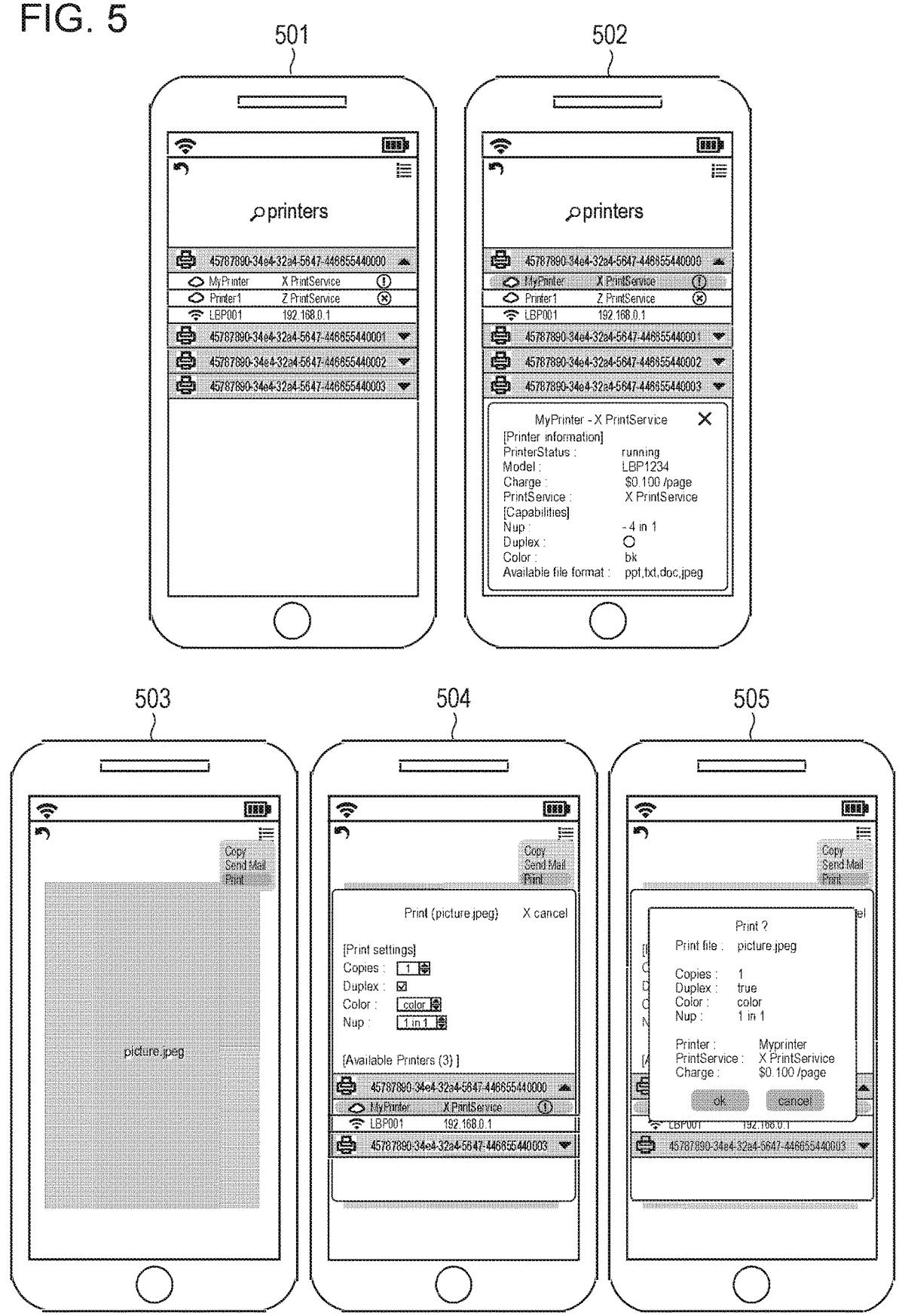
FIG. 5 illustrates example screens of a print application.

FIG. 5 illustrates example screens displayed on the display 215 by the print application 306 of a mobile terminal. A printer list screen 501 is an example of a screen that lists the printers (local printers) 102 detected as a result of the print application 306 searching the local network and lists the printers in the virtual printer information 400 acquired from the print services 105 of vendors. A printer list screen 502 is an example of a screen that displays, when one of the print services 105 has been selected, the virtual printer information 400 about printers registered with the selected print service and information about the vendor indicated by the name 409.

A content display screen 503 is an example screen that displays a preview image of content data selected as an object to be printed, and as a result of the user selecting "print" in the menu of this screen, displays a print attribute selection screen 504. The print attribute selection screen 504 is an example of a screen on which the user selects, prior to printing, the print attributes (number of copies, simplex/duplex printing, color/monochrome, n-up printing, and the like) with which the content data is to be printed. When a printer is selected on the print attribute selection screen 504, a print confirmation screen 505 is displayed for allowing the user to confirm the print settings before executing print processing. When the user presses an ok button after confirming the print settings, the print processing is started.

Processing for Registration and Display of Virtual Printer

Hereinafter, processing (registration processing) for registering a virtual printer with the print service 105 and processing (display processing) for listing the information about the local printers searched for on the local network together with the virtual printer information 400 about virtual printers registered with the print service 105 is described.

First, the processing (registration processing) for registering a virtual printer with the print service 105 will be described. In the present embodiment, the registration processing can be performed by the following two registration methods. A first registration method is a method in which the user performs necessary operations on the operation panel 239 of the printer 102, calls the printer registration interface of the print service 105 from the print service 105, and registers the printer 102 as a virtual printer with the print service 105. A second registration method is a method in which through operation of an operation screen displayed on a touch panel 116 of the mobile terminal 103 by the print application 306, the print application 306 calls the printer registration interface of the print service 105, and registers the specified printer as a virtual printer.

The first printer registration method will be described with reference to a sequence diagram illustrated in FIG. 6A. First, on the operation panel 239 of the printer 102, the user specifies a target print service 105 where registration is to be performed, and inputs user information (the user ID 401 or a password) used to access the print service 105. The printer 102 accesses the print service 105 by using the input user information. Note that in the case in which information such as an access token or credentials issued by the print service 105 has been stored in the printer 102 in advance, the print service 105 may be accessed by using the stored information. Next, the printer 102, through the registration interface of the print service 105, transmits the printer information 425 of the printer 102 to the print service 105. Note that the printer ID 414 included in the printer information 425 is an ID (identifier) for uniquely identifying the printer 102. Note that since the printer ID 414 that can uniquely identify the printer 102 is used, the print application 306 described later can determine whether or not the virtual printers of respective different print services correspond to the same printer even when a single printer is registered as the virtual printers of a plurality of different print services 105. The registration interface of the print service 105 is an interface provided by the web server 304, and may be the Internet Printing Protocol (IPP) based on Hypertext Transfer Protocol (HTTP) or Hypertext Transfer Protocol Secure (HTTPS), SOAP, or Representational State Transfer (REST). Other interfaces described later provided by the web server 304 of the print service 105 are all included in these protocols. When the print service 105 receives the printer information 425 (pieces of information 414 to 418), the virtual printer management unit 302 stores these pieces of information in the storage unit 305 and manages the information as the virtual printer information 400. Note that information is delivered between the web server 304 and the virtual printer management unit 302 through the control unit 303.

Figure 7:
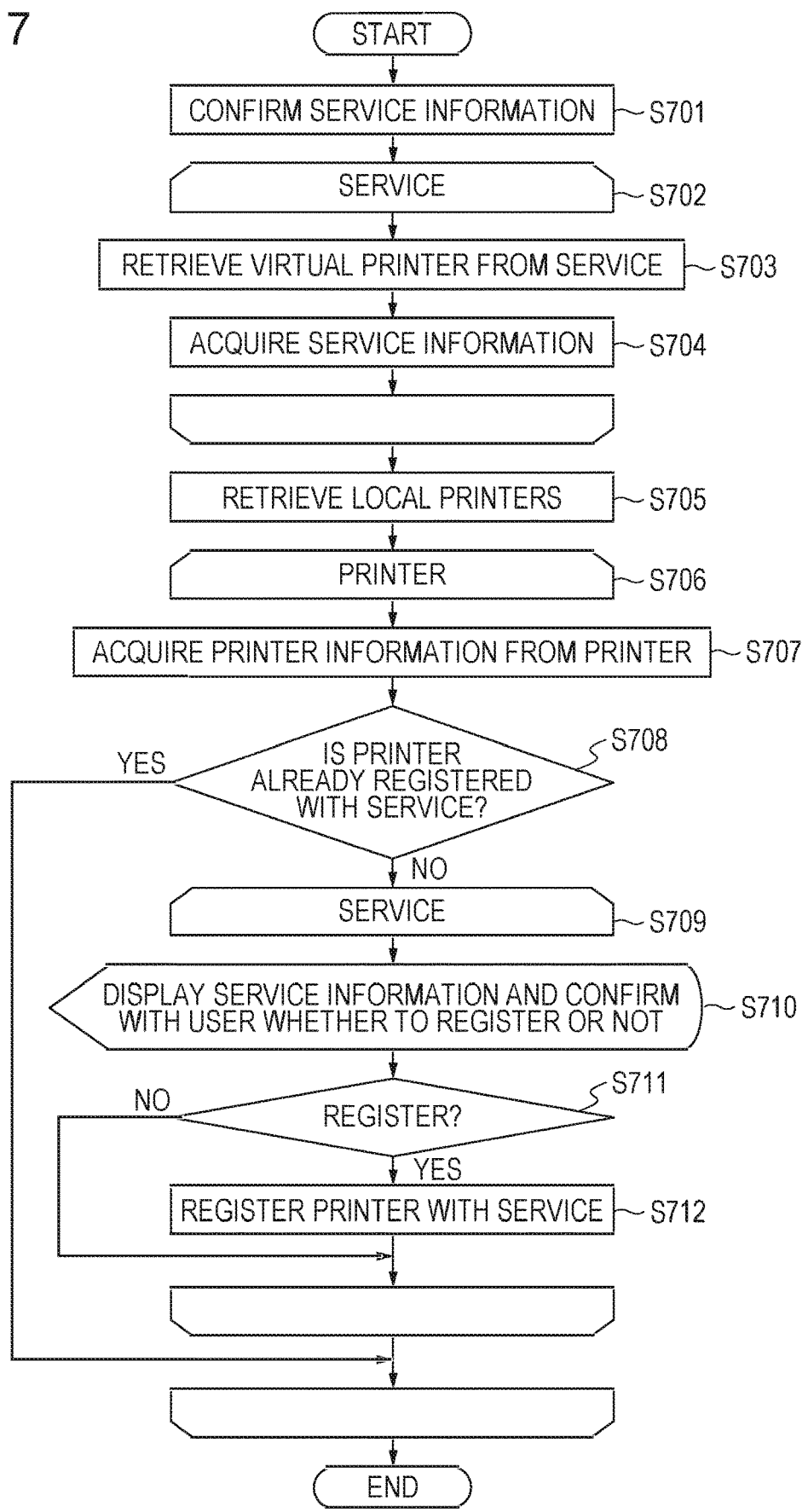
FIG. 7 is a flowchart of printer registration.

The second printer registration method is described with reference to a sequence diagram illustrated in FIG. 6B and a flowchart illustrated in FIG. 7. In the print application 306 of the mobile terminal 103, as described in FIG. 4B, information (410-412) about print services provided by the vendors is stored as the print service information 423. In step S701, the print application 306 confirms the print service information 423.

Step S702 is a loop starting point. Processing of steps S703 to S704 is repeatedly performed, whereby the services 410 stored in the print service information 423 are processed sequentially.

In step S703, the print application 306 calls the printer information acquisition interface of the print service 105 provided by each vendor and acquires the information pieces 401 to 406 about the virtual printers which have already been registered with the print service 105. At this time, the virtual printer management unit 302 of the print service 105 returns to the print application 306 in accordance with a request, from among the information pieces about the virtual printers stored in the storage unit 305, information pieces having the specified user ID 401. Note that the printer information acquisition interface is an interface provided by the web server 304 of the print service 105. The Uniform Resource Locator (URL) of this printer information acquisition interface is the service URL 411. Note that in the case in which information such as an access token or a credential issued by the print service 105 has been stored in the print application 306 in advance, the printer information acquisition interface is called with this information as an argument. In this case, the web server 304 recognizes the user ID 401 by using of a mapping table (not illustrated) with the access token or credential as a key. At the time of accessing, a method may be employed in which by requesting the user to input the user ID 401 and a password, the interface is called with this information as an argument. The validity of information about the access token, credential, or the user ID 401 and a password is verified by the web server 304. Note that processing for requesting attachment of the user ID 401 and a password, or access information such as an access token, a credential, and the like and verifying the information is processing common to all the interfaces. In addition, processing for recognizing the user ID 401 on the basis of the access token or credential is also processing common to all the interfaces.

In step S704, the print application 306 acquires information regarding services (the supported content information 420, the supported print attributes 421, and the vendor information 422) that can be provided by the print service 105 by calling the service acquisition interface of the print service 105. Note that the processing of steps S702 to S704 corresponds to processing for acquiring information regarding the print services and information regarding virtual printers already registered with the print services from print services provided by vendors (company X, company Y), as illustrated in steps S602 to S603 of FIG. 6B.

In step S705, the print application 306 performs broadcasting over a local network, searches for (discovers) the printers 102, and acquires the IP addresses of the printers 102. In other words, the processing of step S705 corresponds to processing in which the print application 306 acquires information regarding printers A and B by receiving responses from the printers A and B as a result of the broadcasting performed by the print application 306, as illustrated in step S604 of FIG. 6B.

Step S706 is a loop starting point. On the basis of information about the plurality of printers 102 acquired in step S705, processing of steps S707 to S712 is repeatedly performed in such a manner that the printers are processed sequentially.

In step S707, the print application 306 acquires the printer information 425 about each of the printers on the basis of the IP addresses 405 of the printers acquired in step S705. At this time, the acquisition request is sent to the web server 310 of the printer 102, and the control unit 308 of the printer 102 responds with the information. The processing of step S707 corresponds to processing for acquiring print information from each of a printer A and a printer B, as illustrated in step S605 of FIG. 6B.

In step S708, the print application 306 determines whether or not the printer information 425 acquired in step S707 corresponds to a printer which has been registered as a virtual printer with the print services 105. This determination is performed by determining whether or not the printer ID 414 included in the printer information 425 acquired in step S707 is the same as one of the printer IDs 402 acquired from the print services 105 in step S702. The processing of step S708 is performed in a print application as illustrated in step S606 of FIG. 6B. When it is determined that the print information acquired in step S707 has not yet been registered with the print service 105 as a result of the determination in step S708, the process proceeds to step S709.

Step S709 is a loop starting point. Processing of steps S710 to S712 is repeatedly performed in such a manner that the print services in which the printer information acquired in step S707 has not been registered as a virtual printer are processed sequentially.

In step S710, the print application 306 displays information (the supported content 420, the print attributes 421, the vendor information 422, and the charge 412) regarding the print service subjected to the processing on the screen of the mobile terminal, whereby asking the user to determine whether or not registration with the print service is to be performed. In other words, information about the attributes of a file that can be processed by the print service, the types of print setting that can be set, and a service charge is displayed, so that the user can determine whether or not to resister the printer in the print service on the basis of this information. In step S711, the print application 306 determines whether or not the user has instructed registration with the print service displayed in step S710. When it is determined that the registration has been instructed, the process proceeds to step S712. In step S712, the print application 306 calls the registration interface of the print service in which registration is to be performed in accordance with the instruction, and the printer is registered therewith as a virtual printer. At this time, the information to be delivered to the printer registration interface includes the information pieces 414 to 418 of the printer information 425 acquired in step S707. In the printer service that has received a registration request from the print application 306, the information pieces 414 to 418 of the printer information 425 received together with the registration request are stored in the storage unit 305 by the virtual printer management unit 302, and the printer is managed as a virtual printer. At this time, delivery of information between the web server 304 and the virtual printer management unit 302 is performed through the control unit 303. The processing of steps S710 to S712 corresponds to the processing in which the print application 306 sends registration requests to print services (company X and company Y) which have been specified as registration destinations by the user, as illustrated in steps S607 and S608 of FIG. 6B.

On the basis of the first registration method or the second registration method. described above, a printer that is desired by a user can be registered, as a virtual printer, with the print service of a vendor desired by the user among a plurality of vendors, by using the print application of the printer 102 or the mobile terminal 103. Further, since the printer ID 414 issued by the printer 102 is used as an identifier for registration of the virtual printer, even when the printer is registered with the print services 105 of vendors as the respective virtual printers, it is easy to determine whether or not a printer has been registered or not. Further, by using the printer ID 414 as the identifier of the virtual printer, it is easy to identify virtual printers which are the same printer among the virtual printers registered with different print services. In addition, by determining whether or not registration is to be made by showing the user the supported content information 420, the print attributes 421, the vendor information 422, and the charge 412, registration of a virtual printer in the print service 105 that is not intended by the user is suppressed.

Figure 8:
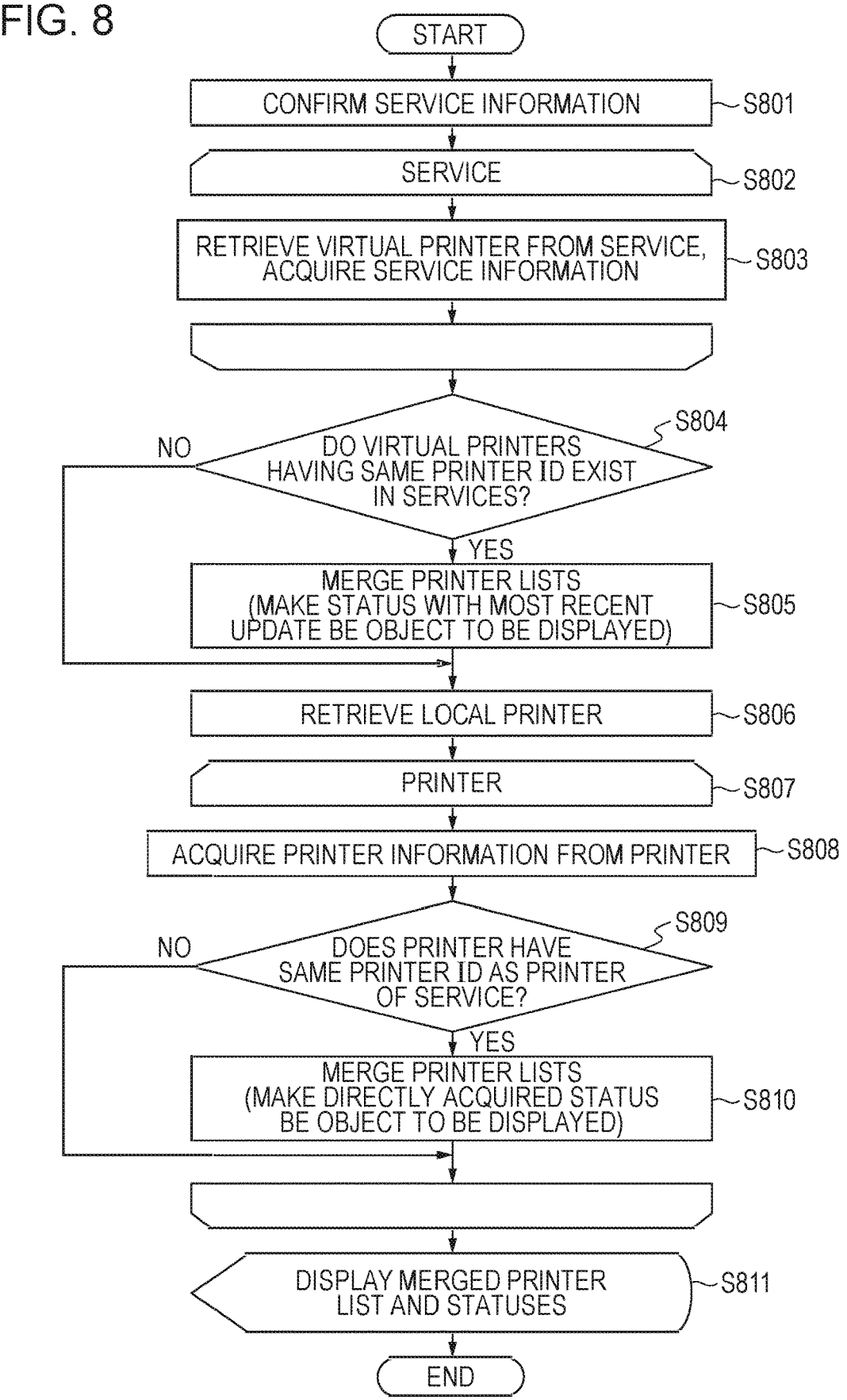
FIG. 8 is a flowchart of displaying the status of a printer list.

Next, processing (display processing), performed by the print application 306, for displaying a list of information about printers searched for in a local network together with the virtual printer information 400 registered with the print service 105 will be described. Here, referring to FIG. 8, a method of displaying the status information pieces about the same printer in such a manner that the information pieces are integrated will be described, for the case in which the print application 306 displays printers searched for in the local network and the virtual printers registered with the print services 105 of vendors.

The print application 306 of the mobile terminal 103, when instructed by a user to display a list of printers, first obtains the print service information 423 stored in the storage device in step S801. Step S802 is a loop starting point. Processing of step S803 is repeatedly performed in such a manner that the services 410 registered with the print service information 423 are processed sequentially. In step S803, the print application calls a printer information acquisition interface provided by a print service 105 of each vendor and acquires the virtual printer information 400 (information pieces 401 to 406) already registered with each print service 105. Further, the print application calls a service acquisition interface of each print service 105 and acquires the content 407, the capabilities 408, and the vendor name 409.

In step S804, the print application 306 determines whether or not there are printer IDs 402 having the same ID in the virtual printer information 400 acquired from each print service 105. When it is determined that there are virtual printers having the same ID, the process proceeds to step S805, where printer information pieces about the virtual printers having the same printer ID are merged into a single piece of information in the memory within the print application 306. At this time, the print application 306 merges the statuses 406 included in the respective virtual printers in such a manner that one whose time (date and time) of update 427 is the most recent is displayed. Note that the status to be displayed may be chosen and displayed by taking into consideration not only the date and time of update, but also whether or not the printer information is obtained from the print service 105 provided by a vendor which is the same as the vendor (maker) of the printer 102 associated with the virtual printer.

In step S806, the print application 306, through broadcasting over the network to which the mobile terminal is connected, searches for the printers 102 and acquires the IP addresses of the detected printers. Step S807 is a loop starting point, and processing of steps S808 to S810 is repeatedly performed in such a manner that the IP addresses of the detected printers searched for in step S806 are processed sequentially.

In step S808, the print application 306 acquires the printer information 425 (information pieces 414 to 418) from a printer corresponding to the IP address of the printer to be processed. Specifically, an acquisition request to the printer 102 corresponding to the IP address of the printer to be processed is sent to the web server 310 of the printer 102 and the control unit 308 of the printer 102 replies with the information.

In step S809, the print application 306 determines whether or not the printer ID 414 acquired from the printer 102 in step S808 is the same as the printer ID 402 of a virtual printer acquired in step S803 from print services of vendors. When it is determined that the Ms are the same, the process proceeds to step S810, where the print application 306 replaces the status 406 of the virtual printer information 400 obtained from the print service 105 with the status 417 acquired directly from the printer 102 in step S808, thereby performing printer information merging. Then the print application 306 stores the merged printer information in the memory as combined information. In step S811, the print application 306 makes a list of pieces of the merged print information and displays the list on the display of the mobile terminal 103. The collective printer information subsequent to merging is displayed for each printer, as illustrated by 501 and 502 in FIG. 5.

Since printer information (status 406) acquired from the print services of vendors and printer information (status 417) acquired directly from the printer 102 are integrated and displayed for each printer through printer information display processing described above, it is easy for a user to see the information. Further, even in the case in which the statuses of a virtual printer stored in respective print services are different from one another due to, for example, a difference in update time among the statuses, the most appropriate one among the different statuses can be displayed.

As described above, in the case in which virtual printers respectively managed by print services of vendors correspond to the same printer, the virtual printers which have been determined to be the same printer are presented to a user as a single printer, thereby enabling simple display and intuitive recognition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The invention claimed is:

1. A printer registration apparatus comprising:
a memory that stores a computer program; and
a processor that executes the computer program to perform:
acquiring, from each of a plurality of remote print service providers, a printer ID of each virtual printer that is registered in the print service provider;
acquiring, from each of the plurality of print service providers, print service information describing print services that are provided by the print service provider;
searching a local network for a local printer connected to the local network and obtaining a printer ID of the searched-for local printer;
determining, for each of the plurality of print service providers, whether the searched-for local printer has already been registered as a virtual printer in the print service provider by comparing the printer ID of the searched-for local printer with each printer ID acquired from the print service provider;

automatically displaying on a display, when it is determined that the searched-for local printer has not already been registered as a virtual printer in at least one of the plurality of print service providers, the acquired print service information corresponding to each print service provider in which the searched-for local printer is determined to have not already been registered, and not automatically displaying on the display, the acquired print service information corresponding to any of the print service providers in which the searched-for local printer is determined to have already been registered; and registering, when a user selects one of the print service providers corresponding to the displayed print service information, the searched-for local printer as a virtual printer in the selected print service provider.

2. The printer registration apparatus according to claim 1, wherein the displayed print service information corresponding to each print service provider includes at least one of an attribute of a document file that can be handled by each print service provider, a type of print setting that can be specified by each print service provider, and a charge for using each print service provider.

3. The printer registration apparatus according to claim 1, wherein print service information that is registered when the searched-for local printer is registered as the virtual printer includes the printer ID of the searched-for local printer.

4. The printer registration apparatus according to claim 3, wherein the processor executes the computer program to further perform:

displaying a printer list that lists, as a group, virtual printers whose printer IDs are the same using the printer ID included in the acquired print service information corresponding to the virtual printers.

5. The printer registration apparatus according to claim 4, wherein the processor executes the computer program to further perform:

collecting, among status information pieces included in the print service information corresponding to the virtual printers, the status information pieces corresponding to virtual printers whose printer IDs are the same; and displaying, for each group of virtual printers whose printer IDs are the same, the collected status information pieces.

6. The printer registration apparatus according to claim 5, wherein the processor executes the computer program to further perform:

displaying the most recently updated status information piece, when displaying, among status information pieces included in the acquired print service information corresponding to each virtual printer, the status information pieces corresponding to the virtual printers whose printer IDs are the same.

7. The printer registration apparatus according to claim 3, wherein the processor executes the computer program to further perform:

displaying, on a basis of the printer ID included in acquired print service information corresponding to a virtual printer and a printer ID of the searched-for local printer, a printer list that lists the virtual printers whose printer IDs are the same as a group and the searched-for local printer.

8. The printer registration apparatus according to claim 1, wherein the plurality of print service providers are connected through the Internet.

9. The printer registration apparatus according to claim 1, wherein the printer registration apparatus is a mobile terminal.

10. A non-transitory computer-readable medium storing a program that causes a computer to perform:

acquiring, from each of a plurality of remote print service providers, a printer ID of each virtual printer that is registered in the print service provider;

acquiring, from each of the plurality of print service providers, print service information describing print services that are provided by the print service provider;

searching a local network for a local printer connected to the local network and obtaining a printer ID of the searched-for local printer;

determining, for each of the plurality of print service providers, whether the searched-for local printer has already been registered as a virtual printer in the print service provider by comparing the printer ID of the searched-for local printer with each printer ID acquired from the print service provider;

automatically displaying on a display, when it is determined that the searched-for local printer has not already been registered as a virtual printer in at least one of the plurality of print service providers, the acquired print service information corresponding to each print service provider in which the searched-for local printer is determined to have not already been registered, and not automatically displaying on the display, the acquired print service information corresponding to any of the print service providers in which the searched-for local printer is determined to have already been registered; and registering, when a user selects one of the print service providers corresponding to the displayed print service information, the searched-for local printer as a virtual printer in the selected print service provider.

11. A printer registration method comprising:

acquiring, from each of a plurality of remote print service providers, a printer ID of each virtual printer that is registered in the print service provider;

acquiring, from each of the plurality of print service providers, print service information describing print services that are provided by the print service provider;

searching a local network for a local printer connected to the local network and obtaining a printer ID of the searched-for local printer;

determining, for each of the plurality of print service providers, whether the searched-for local printer has already been registered as a virtual printer in the print service provider by comparing the printer ID of the searched-for local printer with each printer ID acquired from the print service provider;

automatically displaying on a display, when it is determined that the searched-for local printer has not already been registered as a virtual printer in at least one of the plurality of print service providers, the acquired print service information corresponding to each print service provider in which the searched-for local printer is determined to have not already been registered, and not automatically displaying on the display, the acquired print service information corresponding to any of the print service providers in which the searched-for local printer is determined to have already been registered; and registering, when a user selects one of the print service providers corresponding to the displayed print service information, the searched-for local printer as a virtual printer in the selected print service provider.

* * * * *